United States Patent [19]

Chen et al.

[11] Patent Number: 4,558,170

[45] Date of Patent: Dec. 10, 1985

[54] POLYISOBUTYLENE PROCESS

[75] Inventors: Frank J. Chen, Piscataway; Darrell W. Brownawell, Scotch Plains, both of N.J.

[73] Assignee: Exxon Research & Engineering Co., Florham Park, N.J.

[21] Appl. No.: 652,205

[22] Filed: Sep. 20, 1984

Related U.S. Application Data

[63] Continuation of Ser. No. 508,441, Jun. 29, 1983, abandoned, which is a continuation-in-part of Ser. No. 407,763, Aug. 13, 1982, abandoned.

[51] Int. Cl.$^4$ ............................................. C07C 2/18
[52] U.S. Cl. .................................... 585/532; 585/510; 585/518; 585/520; 585/530; 585/531; 585/329
[58] Field of Search ............... 585/510, 518, 520, 530, 585/531, 532, 329

[56] References Cited

U.S. PATENT DOCUMENTS 3,119,884  1/1964  Allen et al. ...................... 585/532

Primary Examiner—D. E. Gantz
Assistant Examiner—A. Pal
Attorney, Agent, or Firm—John J. Mahon; Robert A. Maggio

[57] ABSTRACT

Polyisobutylene is prepared from a mixed $C_4$ hydrocarbon feedstream using an $AlCl_3$—HCl catalyst system wherein the HCl is introduced separately into the feedstream to form organochloride in the feedstream. Polymer product having a very narrow molecular weight distribution is obtained over the Mn range of 700 to 3,000. Dispersants derived from this polyisobutylene exhibit substantially improved performance in lubricating oil compositions.

8 Claims, No Drawings

POLYISOBUTYLENE PROCESS

This application is a continuation of application Ser. No. 508,441, filed Jun. 29, 1983, which is a continuation-in-part of application Ser. No. 407,763, filed Aug. 13, 1982, now both abandoned.

This invention relates to the polymerization of isobutylene and, more particularly, this invention relates to the production of polyisobutylene from a mixed $C_4$ feedstream utilizing an aluminum chloride-hydrogen chloride co-catalyst system.

The production of isobutylene polymers from mixed $C_4$ hydrocarbon feedstreams is generally known in the art. It is also known to utilize $AlCl_3$ as the polymerization catalyst in such processes and the prior art discloses a number of co-catalyst or catalyst promoters, including hydrogen chloride, for use under various conditions in isobutylene polymerization.

Representative disclosures include U.S. Pat. No. 2,957,930, which shows the use of 10 to 20% $AlCl_3$ catalyst in the production of polyisobutylene from a $C_1$–$C_5$ petroleum gas feedstock with 0.08 to 0.12 percent HCl, relative to $AlCl_3$, used as a catalyst promoter. This reference notes that correspondingly small quantities of water vapor or chloroform, which can react with $AlCl_3$ to release HCl, may also be used. British Pat. No. 1,195,760 (1970) discloses the production of olefin polymers by polymerization in the presence of the catalyst comprising a liquid complex of $AlCl_3$, HCl and an alkyl benzene. Polymerization products include materials other than polyisobutylene and products with a narrow molecular weight distribution are disclosed in this reference.

U.S. Pat. Nos. 3,200,169 and 3,200,170 deal with the reaction mixture separation methods after polymerization of propylene or butylene feeds utilizing an ammonia treatment process. HCl is disclosed in the references as a suitable catalyst promoter added to the reaction zone which contains an $AlCl_3$ catalyst.

U.S. Pat. No. 3,997,129 discloses polybutenes from a $C_1$–$C_5$ liquified refinery stream wherein the catalyst is solid particles of $AlCl_3$ promoted with HCl gas or its equivalent. This process employs a static mixer for mixing catalysts and feed prior to conducting polymerization.

U.S. Pat. No. 3,985,822 relates to the production of poly-n-butenes by use of $AlCl_3$ promoted with HCl but the objective is to reduce the isobutylene content of the polymer product.

U.S. Pat. No. 3,119,884 discloses a series of vertical column reactors useful for polymerizing isobutylene and further discloses a catalyst system comprising $AlCl_3$ and HCl or a substance which generates HCl. The catalyst system is described as an acid promoted $AlCl_3$ catalyst. In such a system, a reaction between HCl and $AlCl_3$ occurs to form $H+AlCl_4-$ which is the species that initiates polymerization. According to this process, one method of introducing catalysts and reactants is to have the three materials, i.e. $AlCl_3$, HCl and liquid feed, enter the reactor through the same duct. This necessarily results in polymerization beginning in the duct line in an exothermic reaction and the reaction is not controlled by the refrigeration system of the reactor. Any product formed under these conditions will have an undesirable low molecular weight and broad molecular weight distribution.

The present invention is considered distinguished from the foregoing references in that it produces a polyisobutylene which is especially suitable as the oil soluble hydrocarbon component of a lubricating oil dispersant based upon the reaction of polyisobutenyl succinic anhydride with compounds such as ethylene polyamines and polyols. Polyisobutylene produced in this invention is characterized by a narrow molecular weight distribution in the dispersant molecular weight range, that is, a number average molecular weight ($M_n$) of about 700 to 3,000. Molecular weight distribution is used here in its normal sense as a measure of the breadth of molecular weight distribution and is defined as the ratio of $M_w$ (weight average molecular weight) to $M_n$ (number average molecular weight). This narrow molecular weight distribution results in a product having a relatively lower viscosity than polyisobutylenes produced in heretofore conventional processes in the same molecular weight range. The process is especially characterized in the technique of addition of HCl co-catalyst to the feedstream prior to the feedstream entering the reactor. Other methods of providing HCl which the prior art considers suitable, i.e., such as adding HCl to the reactor itself, adding water or other HCl-generating reagents or adding HCl to $AlCl_3$ prior to initiation of polymerization are not suitable in this invention and do not provide the degree of process control and product quality achieved herein.

In accordance with the present invention there has been discovered a continuous process for preparing low molecular weight polyisobutylene having a $M_n$ in the range of about 700–3,000 and a molecular weight distribution less than about 2.0 from a feedstream mixture of $C_4$ hydrocarbons containing at least about 6% by weight isobutylene in a continuous stirred reactor at a reaction temperature of about $-50°$ C. to $+30°$ C., said reactor having a feedstream inlet and $AlCl_3$ catalyst inlet, which is separate from the feedstream inlet to avoid any admixture of $ACl_3$ and HCl prior to the HCl reacting with the feedstream, which comprises injecting gaseous HCl into said feedstream at a point prior to its entry into the reactor at the inlet, whereby the HCl substantially completely reacts with the feedstream components to form organochlorides, the isobutylene being converted to t-butylchloride, and simultaneously introducing into the reactor the pre-reacted feedstream at the feedstream inlet and the $AlCl_3$ catalyst at the $AlCl_3$ catalyst inlet, and continuously contacting said pre-reacted feedstream with said $AlCl_3$ catalyst in the reactor whereby polymerization occurs to form said polyisobutylene in the reaction mixture, withdrawing reaction mixture from the reactor, quenching the reaction mixture with aqueous alkali and separating therefrom polyisobutylene product, including stripping of unreacted $C_4$ hydrocarbons and polyisobutylenes below $M_n$ of 300 so that less than 25 wt. % polyisobutylene below $M_n$ of 500 is in the final product.

The feedstock for the process of this invention is a mixture of pressure liquified $C_4$ hydrocarbons such as catalytic cracked $C_4$ or steam cracked $C_4$ fractions which contain at least about 6% up to about 50% isobutylene together with butene-1, cis- and trans-butene-2, n-butene, isobutane and less than about 1% butadiene. The preferred $C_4$ feedstream is derived from refinery catalytic or steam cracking and contains about 6–45% by weight isobutylene, about 25–35% saturated butanes and about 15–50% 1- and 2- butenes. The $C_4$ products other than isobutylene function as the reaction medium and are a non-critical aspect of this invention. The isobutylene content of the feedstock should not however fall below about 5 wt % of the feedstream. The feedstream is maintained at a sufficient pressure to be in liquid form both in the reactor inlet and in the reaction mixture itself at the reaction temperature of about −50° C. to +30° C., conventional cooling means being used to maintain the reaction at these temperatures in view of the exothermic nature of the reaction. Preferred reaction temperatures are about −10° C. to +10° C. and most preferred −5° to +5°. Generally, relatively higher temperatures tend to produce relatively lower molecular weight polymer.

The present invention uses a continuous type stirred reactor having two separate inlet means for simultaneous introduction of pre-reacted feedstream and aluminum chloride catalyst, the latter being added either in the form of a slurry in saturated $C_4$ hydrocarbon diluent, such as isobutane or mixtures of saturated butanes, the slurry containing about 0.05–0.5 wt % $AlCl_3$ or in the form of a dry powder $AlCl_3$, such as finely divided $AlCl_3$ particles of about 50 to 100 mesh (U.S.S.).

The feedstream inlet is fitted with a device for injection of gaseous HCl co-catalyst at a point prior to reactor entry. The HCl addition port is positioned sufficiently in advance of the reactor to permit substantially complete reaction of the HCl in the feedstream with isobutylene to form a t-butylchloride. Other organo chlorides are formed, principally 2-chlorobutane. Free HCl in the feedstream inlet at the point of reactor entry should therefore be about 1.0 ppm or less in order to achieve the advantage of the invention. $AlCl_3$ cannot be admixed with the feedstream otherwise uncontrolled, exothermic polymerization will be initiated.

The feedstream, pre-reacted with gaseous HCl, is simultaneously and continuously added to the reactor with $AlCl_3$ catalyst being introduced into the reaction mixture through a separate inlet. Polymerization occurs in an exothermic reaction by contacting the two incoming streams in a cooled reactor with reactor temperature, preferably maintained at about −10° C. to +10° C. For a continuous-type stirred reactor, average reactant residence time will generally be about 10 to 45 minutes. There will generally be employed 0.001 to 0.008 moles of $AlCl_3$ catalyst per mole of isobutylene and 25 to 200 ppm (parts per million) of HCl co-catalyst per parts by weight of feedstream, with the preferred range being 50 to 150 ppm HCl.

The polyisobutylene prepared in accordance with this invention offers a number of advantages over polyisobutylene prepared by prior art techniques with respect to those properties which are important for its use in making lubricating oil dispersant, typically in a form of the reaction product of polyisobutenyl succinic anhydride with polyamines or polyols.

The significant aspect is that the process of this invention permits a more precise control of polyisobutylene production than heretofore possible. In lubricating oil dispersant technology it is known that a relatively higher molecular weight polyisobutylene group provides dispersant additive exhibiting better engine performance in terms of sludge dispersancy and varnish deposit inhibition. However, conventional techniques for manufacturing polyisobutylene have heretofore been somewhat unsatisfactory, since the viscosities of such relatively higher molecular weight materials increased proportional to the molecular weight, thereby causing a number of problems in both handling and manufacture of the dispersant products. These problems were due to the inherently broader molecular weight distribution of such products. Here, the present process offers the advantage of controlling molecular weight in that a narrow molecular weight distribution is obtained which, for a given molecular weight range, results in a material having a relatively lower viscosity. Molecular weight distribution of the product is less than 2, preferably about 1.90 to 1.95. Preferred polyisobutylenes are those having an Mn of about 900 to 2,500, such as about 1300 and a viscosity of about 190–250 centistokes at 100° C.

In the process of the present invention, a high degree of reactor controllability is achieved and the target specification of molecular weight and molecular weight distribution which is desired can be met through monitoring and adjustment of incoming catalyst addition rate, such as the HCl addition rate relative to isobutene content, reactor temperature, residence time, feedstream introduction rate and the like. These parameters and the quality of the finished product can be monitored at close time intervals in the practice of the present invention. Thus, for a given polyisobutylene molecular weight desired, process conditions can be defined which will direct the process toward the target product.

The process of this invention also provides a number of product quality improvements in the polyisobutylene product which are carried over to the quality of the dispersant additive ultimately produced. It has been observed in accordance with this invention that ultra violet absorption values for the product are relatively lower than prior art product. These analyses have been considered a measure of instability in dispersant products, probably related to the presence of moieties other than polyisobutylene. Also, the products prepared in accordance to the invention exhibit relatively lower chlorine level which is a distinct advantage since it does tend to minimize or eliminate expensive clay filtration techniques commonly used in order to meet maximum chlorine specification in polyisobutylene-containing products.

Another advantage of the invention is a significant reduction in the quantity of so called "light ends" in the polymer product. These are polyisobutylenes in the undesirable Mn range of about 200 to 500. The process of this invention minimizes the quantity of these materials and the yield of desired product in the high molecular weight range increases accordingly. Products of this invention will generally contain less than about 35% by weight of such low molecular weight polyisobutylenes in the reaction mixture prior to product finishing. After stripping of volatiles and light ends of Mn 300 and below, the finished product polymer will contain less than 25% by weight of polyisobutylene having an Mn below 500. The exact amount of acceptable low molecular weight polyisobutylene will vary depending on product viscosity.

The technique of addition of HCl to the feedstream in the absence of $AlCl_3$ to form a pre-reacted feedstream offers the further advantage of substantially reducing the presence of chlorinated polyisobutylene in the finished product. When dispersant precursor, i.e. polyisobutenyl succinic anhydride, is made from polyisobutylene, any products from the reaction of chlorinated polymer are distinctly disadvantageous. Any polymerization process which permits free HCl to exist in the reactor has this problem and the present invention successfully avoids it through use of the pre-reacted feedstream.

In the present invention, HCl injected into the feedstream reacts quickly with isobutylene to produce t-butyl chloride which, upon entering the reactor, functions as a co-catalyst with $AlCl_3$ to initiate the polymerization, the $AlCl_3$ reacting with the t-butyl chloride to form $AlCl_4$ and a t-butyl cation and thereby initiating polymerization. In contrast to this, when HCl is used to promote $AlCl_3$, the species $H+AlCl_4-$ which is formed by reaction between HCl and $AlCl_3$ initiates the polymerization. Polymerization in accordance with the catalyst species of the present invention is more efficient and provides a degree of process control and product quality not obtainable with prior art procedures based upon the use of $AlCl_3$.

Polyisobutylenes prepared in accordance with this invention are particularly useful as a feedstock for the production of improved lubricating oil dispersants. These dispersants generally comprise the reaction product of polyisobutenyl succinic anhydride or the acid form thereof with monoamines or polyamines having up to about 30 carbon atoms, having at least one primary or secondary amino group such as the alkylene polyamines, particularly the ethylene polyamines, the polyoxyalkylene amines, aromatic and cycloaliphatic amines, hydroxyamines, mono-aliphatic and di-aliphatic substituted amines. Useful dispersants are also formed by reacting monohydric and polyhydric alcohols with the polyisobutenyl succinic anhydride or diacid provided in accordance with this invention and preferred materials are thus derived from polyols having 2 to 6 OH groups containing up to about 20 carbon atoms such as the alkane polyols and alkylene glycols. Also suitable are the polyoxyalkylene alcohols such as polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 wt. % boron in the dispersant. Metals and metal-containing compounds can also form useful dispersants and these are compounds capable of forming salts with the polyisobutenyl succinic anhydride or acid of the present invention and this include metals such as the alkali metals, alkaline earth metals, zinc, cadmium, lead, cobalt, nickel, copper, iron, chromium, magnesium and derivatives thereof such as oxides, carboxylates, halides, phosphates, sulfates, carbonates, hydroxides and the like.

Lubricating oil compositions will usually contain dispersants in amounts of from about 1 to 15 wt. % based on the overall weight of the composition. Lubricating oil compositions will typically contain other additives in customary amounts to provide their normal attendant functions such as metal detergents or basic metal detergent, anti-wear additives, anti-oxidants, viscosity modifiers and the like. Dispersants are conveniently packaged and dispensed in the form of solution concentrates containing about 20 to 50 wt. % dispersant in mineral oils.

The invention is further illustrated by the following examples which are not to be considered as limitative of its scope:

EXAMPLE 1

A liquified anhydrous feedstream composed of 23 wt % isobutene, 22 wt % butene-1 and 55 wt. % saturated butanes was mixed with gaseous anhydrous HCl (150 parts per million HCl per part by weight of feedstream). Analysis showed less than 0.1 ppm HCl remained unreacted. The pre-reacted feed was introduced in liquified form at the rate of 100 ml per minute into a continuous type stirred reactor maintained at $+1°$ C. to $+3°$ C. A slurry of 0.2 wt % $AlCl_3$ was introduced into the reactor at the rate of 50–400 mg $AlCl_3$ per minute and continuously adjusted to maintain the desired molecular weight of polymer. Reaction product was withdrawn continuously at a rate corresponding to the rate of introduction of the feed and the molecular weight of the product was continuously evaluated. Average residence time was between 20–40 minutes. The polymer recovered had an average degree of polymerization of 23 (Mn=1300). Conversion of isobutene to polymer was about 99.0%.

EXAMPLE 2

Example 1 was repeated except that the reactor temperature was increased and maintained at $5°$ C.$\pm 1°$ C. The product polymer had an average degree of polymerization of 16 (Mn=900). The higher temperature produces lower mol. wt. polymer, for each $1°$ C. increase, the mol. wt decreases about 100.

EXAMPLE 3

A liquid feedstream composed of 15–22 wt % isobutene, 15–22 wt % butene-1, 45–55 wt % isobutane, 6–8% n-butene and less than 0.2% butadiene was dried first with $CaCl_2$ and introduced into a reactor feed line. Anhydrous gaseous HCl was introduced into the feed line in advance of the reactor entry point. The amount of HCl introduced into the feed line was in the range of 25 to 80 ppm by weight with average about 70 ppm HCl by weight. Analysis of the pre-reacted incoming feedstream showed less than 0.09 ppm free HCl and t-butyl-chloride was the major organochloride in the feedstream which had an overall organochloride concentration of 55 ppm to 184 ppm. The feedstream was added to a reactor at a rate of about 10,000 gallons per hour at a temperature of $-2°$ C. to $0°$ C. $AlCl_3$ was simultaneously added as a slurry in isobutane at a concentration of 4.0 to 5.0 wt %. Reaction product was withdrawn at a rate corresponding to the feed introduction rate. 98% of isobutene was converted to polymer, less than 0.1 ppm of free HCl remained in the reactor vapor phase. Catalyst addition rate was adjusted continuously to control polymer molecular weight between about 900 and 1300. Catalyst addition rate varied to provide an isobutylene: $AlCl_3$ weight ratio between 300:1 and 50:1 which is equivalent to an isobutylene: $AlCl_3$ mole ratio of from 1:0.001 to 1:0.008. Product polymer had an average viscosity of 190 to 247 Cst. at $100°$ C.

Each product in the foregoing examples had a molecular weight distribution of about 1.90 and 1.95 which was measured after finishing the product by stripping of unreacted $C_4$ hydrocarbons and polyisobutylenes less than Mn=300 so that the finished product met the desired specification of less than 25 wt % of polyisobutylene of Mn=500 or less. Polymers of greater than about Mn 300 cannot be removed by stripping.

What is claimed is:

1. A continuous process for preparing low molecular weight polyisobutylene having an $M_n$ in the range of 700 to 3,000 and a molecular weight distribution less than about 2.0 from a feedstream mixture of $C_4$ hydrocarbons containing at least about 6% by weight isobutylene in a continuous stirred reactor maintained at a reaction temperature of about −50° to +30° C., the reactor having a feedstream inlet and a separate AlCl$_3$ catalyst inlet, which comprises injecting gaseous HCl, in an amount of 25 to 200 ppm parts by weight of feedstream and in the absence of AlCl$_3$, into said feedstream at a point prior to its entry into the reactor in a manner sufficient to permit substantially complete reaction of the HCl with isobutylene to form t-butyl chloride before contact with AlCl$_3$ such that the resulting pre-reacted feedstream at the point of reactor entry contains less than 1.0 ppm HCl, and simultaneously adding the pre-reacted feedstream and the AlCl$_3$ catalyst to the reactor and contacting the pre-reacted feedstream with said catalyst in the reaction mixture to form the polyisobutylene, withdrawing the reaction mixture from the reactor, quenching the reaction with aqueous alkali and separating therefrom the polyisobutylene product.

2. The process of claim 1 wherein there is employed 0.001 to 0.008 moles of AlCl$_3$ catalyst per mole of isobutylene.

3. The process of claim 1 wherein the polyisobutylene product has a molecular weight distribution of about 1.90 to 1.95.

4. The process of claim 1 wherein the polyisobutylene product has a viscosity of 190–250 centistokes at 100° C.

5. The process of claim 1 wherein the temperature range is about −5° C. to +5° C.

6. The process of claim 1 wherein the polyisobutylene has an Mn of about 900 to about 2,500.

7. The process of claim 1 wherein the AlCl$_3$ catalyst is added in the form of finely divided particles.

8. The process of claim 1 wherein the AlCl$_3$ is added in the form of a slurry in C$_4$ hydrocarbons.

* * * * *